(12) United States Patent
Mogi et al.

(10) Patent No.: US 10,739,493 B2
(45) Date of Patent: Aug. 11, 2020

(54) MULTI-OPTICAL AXIS PHOTOELECTRIC SENSOR

(71) Applicant: OMRON Corporation, Kyoto (JP)

(72) Inventors: Shunsuke Mogi, Yasu (JP); Tetsuya Fukumoto, Kusatsu (JP)

(73) Assignee: OMRON Corporation, Kyoto (JP)

( * ) Notice: Subject to any disclaimer, the term of this patent is extended or adjusted under 35 U.S.C. 154(b) by 111 days.

(21) Appl. No.: 16/162,413

(22) Filed: Oct. 17, 2018

(65) Prior Publication Data

US 2019/0196056 A1 Jun. 27, 2019

(30) Foreign Application Priority Data

Dec. 22, 2017 (JP) ................... 2017-246574

(51) Int. Cl.
*G01V 8/20* (2006.01)

(52) U.S. Cl.
CPC ..................... *G01V 8/20* (2013.01)

(58) Field of Classification Search
CPC .... G01V 8/20; G01V 8/12; G01V 8/10; G01J 1/04; G01J 1/0407; G01D 11/30; H01H 35/00
See application file for complete search history.

(56) References Cited

U.S. PATENT DOCUMENTS

| 6,750,439 | B2 * | 6/2004 | Nakazaki | G01V 8/20 |
| | | | | 250/221 |
| 7,122,782 | B2 * | 10/2006 | Sakaguchi | G01V 8/20 |
| | | | | 250/222.1 |
| 7,550,708 | B2 * | 6/2009 | Deguchi | G01J 1/0271 |
| | | | | 250/221 |
| 8,536,510 | B2 * | 9/2013 | Shimokawa | G01V 8/20 |
| | | | | 250/221 |
| 9,304,034 | B2 * | 4/2016 | Ishikawa | G01V 8/20 |
| 9,870,681 | B2 * | 1/2018 | Gelineau | F16P 3/144 |
| 10,309,827 | B2 * | 6/2019 | Kimura | H01H 35/00 |
| 2002/0017604 | A1 | 2/2002 | Nakazaki et al. | |
| 2012/0112049 | A1 | 5/2012 | Shimokawa et al. | |
| 2019/0196056 | A1 * | 6/2019 | Mogi | G01V 8/20 |

FOREIGN PATENT DOCUMENTS

| CN | 102318027 | 1/2012 |
| CN | 203467096 | 3/2014 |
| CN | 104237963 | 12/2014 |
| EP | 1180697 | 2/2002 |
| JP | 2002124170 | 4/2002 |
| JP | 2006098363 | 4/2006 |

(Continued)

OTHER PUBLICATIONS

"Search Report of Europe Counterpart Application", dated May 17, 2019, p. 1-p. 8.

(Continued)

*Primary Examiner* — John R Lee
(74) *Attorney, Agent, or Firm* — JCIPRNET

(57) ABSTRACT

The disclosure prevents a string-shaped elastic member from being sandwiched and held between a light transmitting plate and a frame body or the like in a twisted state. At least a part of a side wall on an outer side of a storage groove (21) is provided with a projection part (22) preventing an elastic member (4) from being twisted.

20 Claims, 13 Drawing Sheets

(56) References Cited

FOREIGN PATENT DOCUMENTS

| JP | 2006107797 | 4/2006 |
|----|------------|--------|
| JP | 4415815 | 2/2010 |
| JP | 2014127456 | 7/2014 |
| KR | 100781761 | 12/2007 |
| TW | 488335 | 5/2002 |
| WO | 2011013643 | 2/2011 |

OTHER PUBLICATIONS

"Office Action of Korea Counterpart Application," with English translation thereof, dated Sep. 25, 2019, pp. 1-9.
Office Action of Taiwan Counterpart Application, with English translation thereof, dated Apr. 2, 2019, pp. 1-12.
"Office Action of China Counterpart Application", dated Apr. 21, 2020, with English translation thereof, pp. 1-18.

* cited by examiner

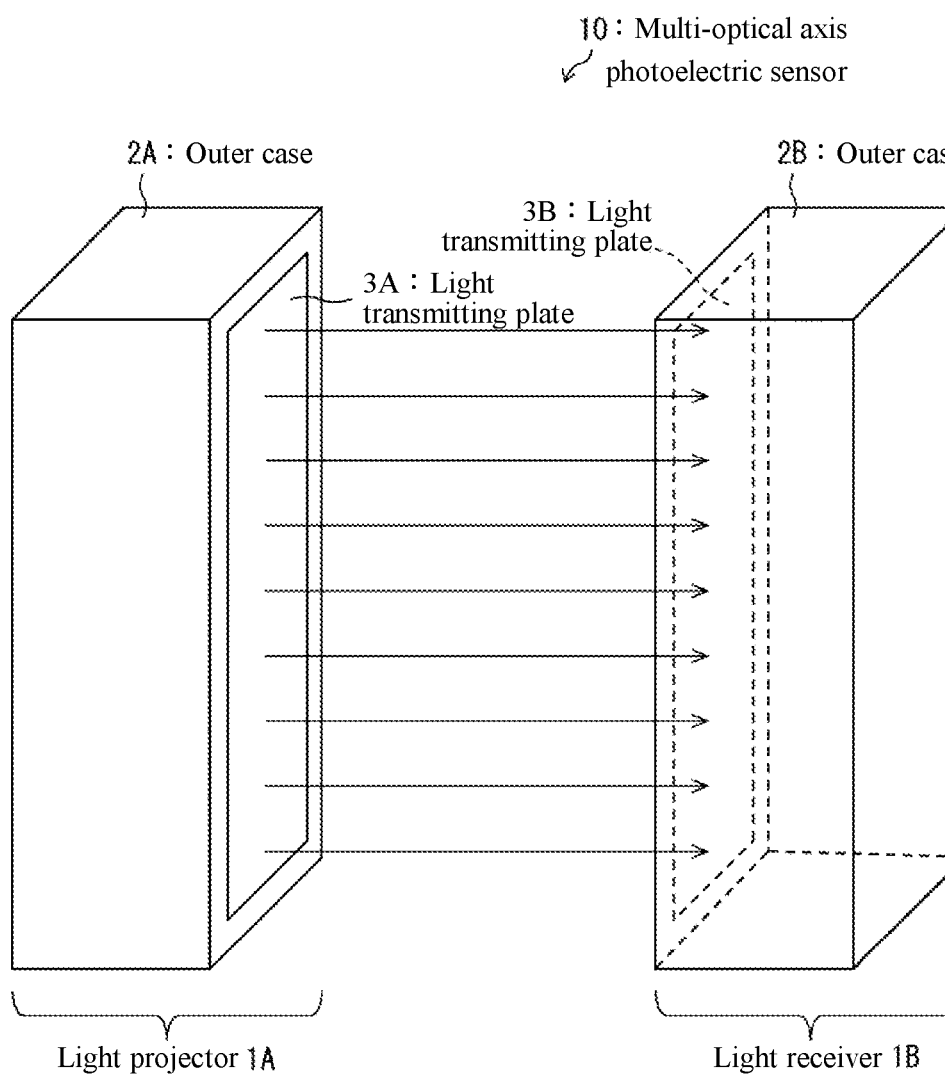
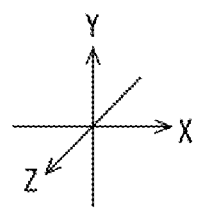
FIG. 2

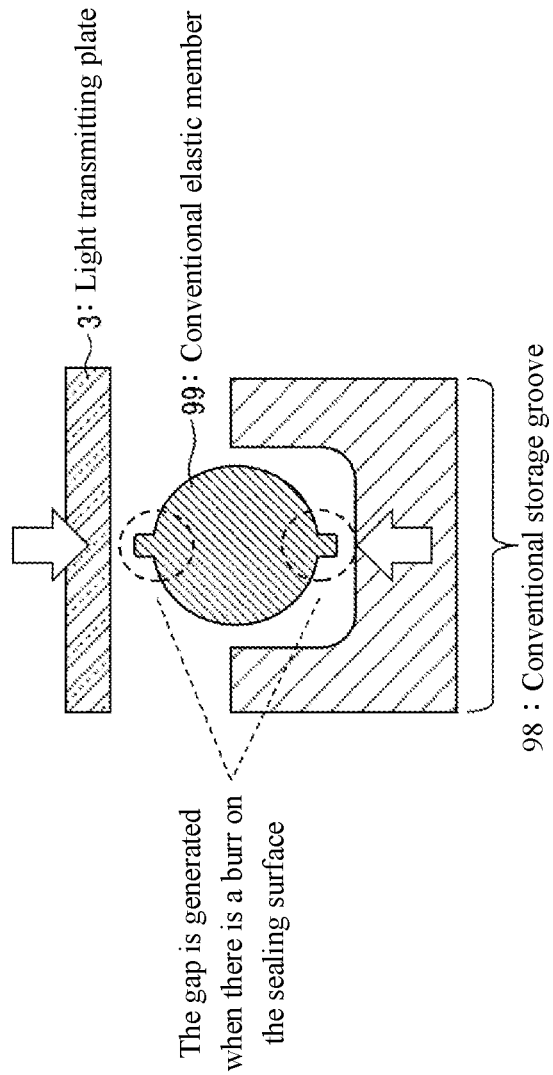

FIG. 12(A)

| Method | | Problem |
|---|---|---|
| Molding method of rubber | Extrusion molding | •The dimensional variation is large, and the control of compressibility involved in sealing is difficult.<br>•The amount of cross-linked structures is less than the amount in die molding, permanent distortion is easily generated. |
| | Die molding | •Burrs are generated on a seam of the die, and when the burrs cut across the sealing surface, a gap is generated and the sealing property is reduced. |
| Sealing method of multi-optical axis photoelectric sensor (※) | | •A method is used in which a string-shaped rubber is arranged in a ring shape around an optical surface (light transmitting plate) and the two ends are connected in order to deal with sensors with different lengths.<br>•The twist occurs easily in the straight part, and when a die molding product is used, burrs may overlap with the sealing surface. |

FIG. 12(B)

MULTI-OPTICAL AXIS PHOTOELECTRIC SENSOR

CROSS-REFERENCE TO RELATED APPLICATION

This application claims the priority benefit of Japanese application serial no. 2017-246574, filed on Dec. 22, 2017. The entirety of the above-mentioned patent application is hereby incorporated by reference herein and made a part of this specification.

BACKGROUND

Technical Field

The disclosure relates to a multi-optical axis photoelectric sensor, in which external shapes of a light projector and a light receiver are respectively formed by a housing including an outer case having an opened front surface and a light transmitting plate for blocking the front surface.

Related Art

Conventionally, in regard to the multi-optical axis photoelectric sensor which detects an object by a light-incident state and a light-shielding state of a plurality of optical axes which are set between the light projector and the light receiver arranged oppositely, a configuration is known in which the light transmitting plate for blocking an opening of the front surface of the light projector and the light receiver is closely fixed to a frame body or the like. For example, in patent literature 1 (International Publication No. WO2011/013643 published on Feb. 3, 2011) disclosed below, the multi-optical axis photoelectric sensor is disclosed which realizes a fixing of the light transmitting plate to the frame body or the like with a simple configuration, by using a string-shaped elastic member to closely fix the light transmitting plate to the frame body or the like, and which can easily deal with size changes of the frame body or the like.

Meanwhile, in the conventional art described above, when a string-shaped elastic member is sandwiched and held between a light transmitting plate and a frame body or the like in a twisted state, it is difficult to closely fix the light transmitting plate to the frame body or the like.

SUMMARY

One aspect of the disclosure realizes a multi-optical axis photoelectric sensor which includes a light projector and a light receiver and prevents a string-shaped elastic member from being sandwiched and held between the light transmitting plate and the frame body or the like in a twisted state.

The multi-optical axis photoelectric sensor of one aspect of the disclosure is a multi-optical axis photoelectric sensor in which external shapes of a light projector and a light receiver are respectively formed by a housing including an outer case having an opened front surface and a light transmitting plate for blocking the front surface, and includes: a storage groove arranged around an outer peripheral part of the outer case; and a string-shaped elastic member that is interposed between the outer case and the light transmitting plate in a state of being stored in the storage groove, and that seals a gap between the outer case and the light transmitting plate; at least a part of a side wall of the storage groove is provided with a concave part that is concave in a direction different from a pressing direction from the light transmitting plate to the elastic member, and the elastic member includes a part arranged in the concave part.

BRIEF DESCRIPTION OF THE DRAWINGS

FIG. 2 is a perspective view showing an example of external shape of the multi-optical axis photoelectric sensor including the housing in FIG. 1(A) and FIG. 1(B).

FIG. 12(A) and FIG. 12(B) is a drawing illustrating a conventional elastic member and a conventional storage groove.

DESCRIPTION OF THE EMBODIMENTS

Figure 1A:
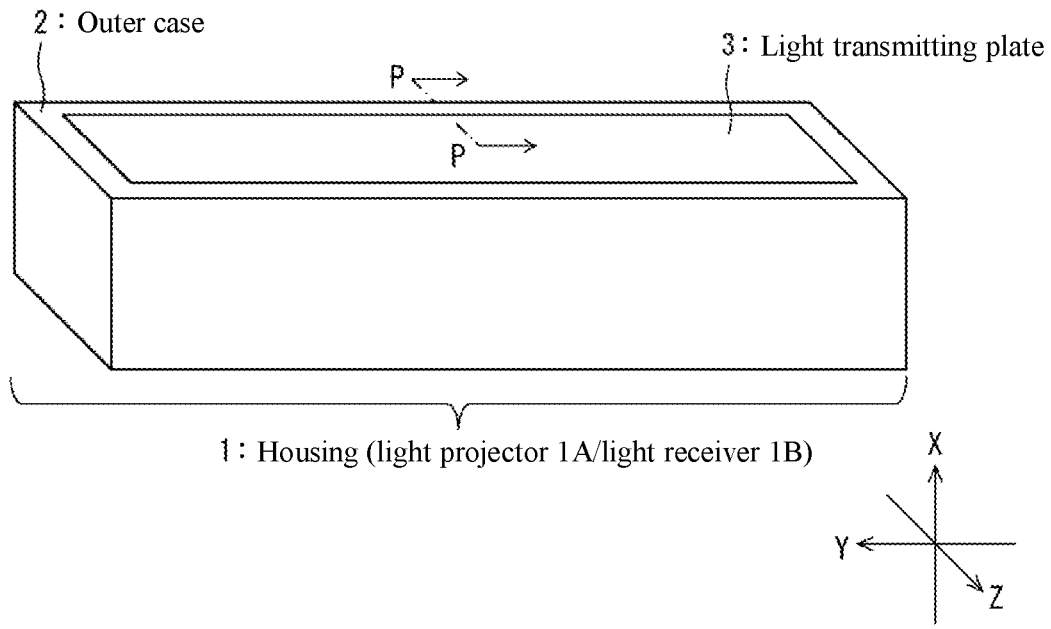
FIG. 1(A) and FIG. 1(B) is a drawing illustrating an outline and the shape of major parts of a housing of a multi-optical axis photoelectric sensor according to an embodiment 1 of the disclosure.

The multi-optical axis photoelectric sensor of one aspect of the disclosure is a multi-optical axis photoelectric sensor in which external shapes of a light projector and a light receiver are respectively formed by a housing including an outer case having an opened front surface and a light transmitting plate for blocking the front surface, and includes: a storage groove arranged around an outer peripheral part of the outer case; and a string-shaped elastic member that is interposed between the outer case and the light transmitting plate in a state of being stored in the storage groove, and that seals a gap between the outer case and the light transmitting plate; at least a part of a side wall of the storage groove is provided with a concave part that is concave in a direction different from a pressing direction from the light transmitting plate to the elastic member, and the elastic member includes a part arranged in the concave part.

According to the above-described configuration, in the multi-optical axis photoelectric sensor, at least a part of the side wall of the storage groove is provided with the concave part which is concave in the direction different from the pressing direction from the light transmitting plate to the elastic member, and the elastic member includes the part arranged in the concave part. Then, by an interference of an inner wall of the concave part provided on the side wall the storage groove and the part of the elastic member arranged in the concave part, the elastic member is prevented from rotating in the storage groove in a direction perpendicular to a peripheral direction of the storage groove.

Accordingly, the multi-optical axis photoelectric sensor exhibits an effect of suppressing the occurrence of a situation in which "the elastic member is sandwiched between the outer case and the light transmitting plate in the twisted state, and it is difficult to closely fix the light transmitting plate to the outer case".

In the multi-optical axis photoelectric sensor of one aspect of the disclosure, at least a part of the side wall of the storage groove may be provided with a projection part which is convex toward another side wall, and the concave part may be formed by the projection part, the side wall of the storage groove, and a bottom surface of the storage groove.

According to the above-described configuration, in the multi-optical axis photoelectric sensor, at least a part of the side wall of the storage groove is provided with the projection part which is convex toward another side wall, and the concave part is formed by the projection part, the side wall of the storage groove, and the bottom surface of the storage groove. Then, by an interference of the projection part and the part of the elastic member arranged in the concave part, the elastic member is prevented from rotating in the direction perpendicular to the peripheral direction of the storage groove in the storage groove.

Accordingly, the multi-optical axis photoelectric sensor exhibits the effect of suppressing the occurrence of the situation in which "the elastic member is sandwiched between the outer case and the light transmitting plate in the twisted state, and it is difficult to closely fix the light transmitting plate to the outer case".

In the multi-optical axis photoelectric sensor of one aspect of the disclosure, on at least a part of the elastic member, a sealing part and a twist suppression part are integrally formed, the sealing part is pressed to the bottom surface of the storage groove by the light transmitting plate, and the twist suppression part is not in contact with the light transmitting plate and is stored in a space formed in the concave part.

According to the above-described configuration, in the multi-optical axis photoelectric sensor, in at least a part of the elastic member, the sealing part and the twist suppression part are integrally formed. Then, the sealing part seals a gap between the outer case and the light transmitting plate; the twist suppression part is stored in the concave part.

Accordingly, in the multi-optical axis photoelectric sensor, the effect is exhibited that "the twisting of the sealing part in the storage groove" is prevented by the interference of the twist suppression part and the inner wall of the concave part, and the sealing part can seal the gap between the outer case and the light transmitting plate.

In the multi-optical axis photoelectric sensor of one aspect of the disclosure, in regard to at least a part of the elastic member, in the cross section perpendicular to an extending direction of the elastic member, the length in a direction perpendicular to the pressing direction may be longer than the length in the pressing direction from the light transmitting plate to the elastic member.

According to the above-described configuration, in the multi-optical axis photoelectric sensor, in regard to at least a part of the elastic member, in the cross section perpendicular to the extending direction of the elastic member, the length in the direction perpendicular to the pressing direction is longer than the length in the pressing direction from the light transmitting plate to the elastic member.

Accordingly, the multi-optical axis photoelectric sensor exhibits the effect of preventing the elastic member from rotating in the direction perpendicular to the peripheral direction of the storage groove in the storage groove, that is, the elastic member is prevented from being sandwiched between the outer case and the light transmitting plate in the twisted state.

In the multi-optical axis photoelectric sensor of one aspect of the disclosure, the cross section of the sealing part perpendicular to the extending direction of the elastic member may be substantially circular.

According to the above-described configuration, in the multi-optical axis photoelectric sensor, the cross section perpendicular to the extending direction of the elastic member of the sealing part that seals the gap between the outer case and the light transmitting plate is substantially circular. Accordingly, the multi-optical axis photoelectric sensor exhibits the effect of sealing the gap between the outer case and the light transmitting plate by the sealing part in which the cross section is substantially circular.

In the multi-optical axis photoelectric sensor of one aspect of the disclosure, the twist suppression part may include a part which is convex toward the inner wall of the concave part in a state that the elastic member is stored in the storage groove.

According to the above-described configuration, in the multi-optical axis photoelectric sensor, the twist suppression part that prevents the sealing part from being twisted in the storage groove includes the part that is convex toward the inner wall of the concave part in the state that the elastic member is stored in the storage groove.

Accordingly, the multi-optical axis photoelectric sensor exhibits an effect of easily storing the elastic member in the storage groove, in particular of easily storing the twist suppression part in the concave part.

In the multi-optical axis photoelectric sensor of one aspect of the disclosure, in the elastic member stored in the storage groove that is formed in a corner part of the outer case, the sealing part may be formed and the twist suppression part may not be formed.

According to the above-described configuration, in the multi-optical axis photoelectric sensor, in the elastic member stored in the storage groove that is formed in the corner part of the outer case, the sealing part is formed and the twist suppression part is not formed.

Here, when the twist suppression part is formed in the elastic member stored in the storage groove of the corner part, the elastic member emerges from the storage groove and easily falls out of the storage groove. Therefore, the twist suppression part is not formed in the elastic member stored in the storage groove of the corner part.

Accordingly, the multi-optical axis photoelectric sensor exhibits the effect of preventing the elastic member from emerging from the storage groove and falling out of the storage groove, and sealing the gap between the outer case and the light transmitting plate by the elastic member.

In the multi-optical axis photoelectric sensor of one aspect of the disclosure, the elastic member stored in the storage groove that is formed in a straight part of the outer case, and the elastic member stored in the storage groove that is formed in the corner part of the outer case may be separable.

According to the above-described configuration, in the multi-optical axis photoelectric sensor, the elastic member stored in the storage groove that is formed in the straight part of the outer case, and the elastic member stored in the storage groove that is formed in the corner part of the outer case are separable.

Accordingly, the multi-optical axis photoelectric sensor exhibits an effect of easily storing the elastic member in the storage groove, compared with the elastic member in which the part stored in the storage groove of the straight part and the part stored in the storage groove of the corner part are formed integrally.

According to one aspect of the disclosure, the multi-optical axis photoelectric sensor can prevent the string-shaped elastic member from being sandwiched and held between the light transmitting plate and the frame body or the like in a twisted state.

Embodiment 1

An embodiment of one aspect of the disclosure (also referred to as "the embodiment" hereinafter) is illustrated below based on FIG. 1(A) to FIG. 12(B). Furthermore, the same or equivalent part in the drawings is denoted by the same symbol, and the description thereof is not repeated. In order to facilitate the understanding of a multi-optical axis photoelectric sensor 10 of one embodiment of the disclosure, firstly, an external shape example of the multi-optical axis photoelectric sensor 10 is illustrated using FIG. 2.

§ 1. Application Example (External Shape Configuration of Multi-Optical Axis Photoelectric Sensor)

FIG. 2 is a perspective view showing an external shape example of the multi-optical axis photoelectric sensor 10. As shown in FIG. 2, the multi-optical axis photoelectric sensor 10 is provided with a light projector 1A and a light receiver 1B which are oppositely arranged with a prescribed detection area interposed therebetween. As illustrated in FIG. 2, a plurality of optical axes is set between the light projector 1A and the light receiver 1B, and the multi-optical axis photoelectric sensor 10 detects an object by a light-incident state and a light-shielding state of these optical axes.

Figure 3:
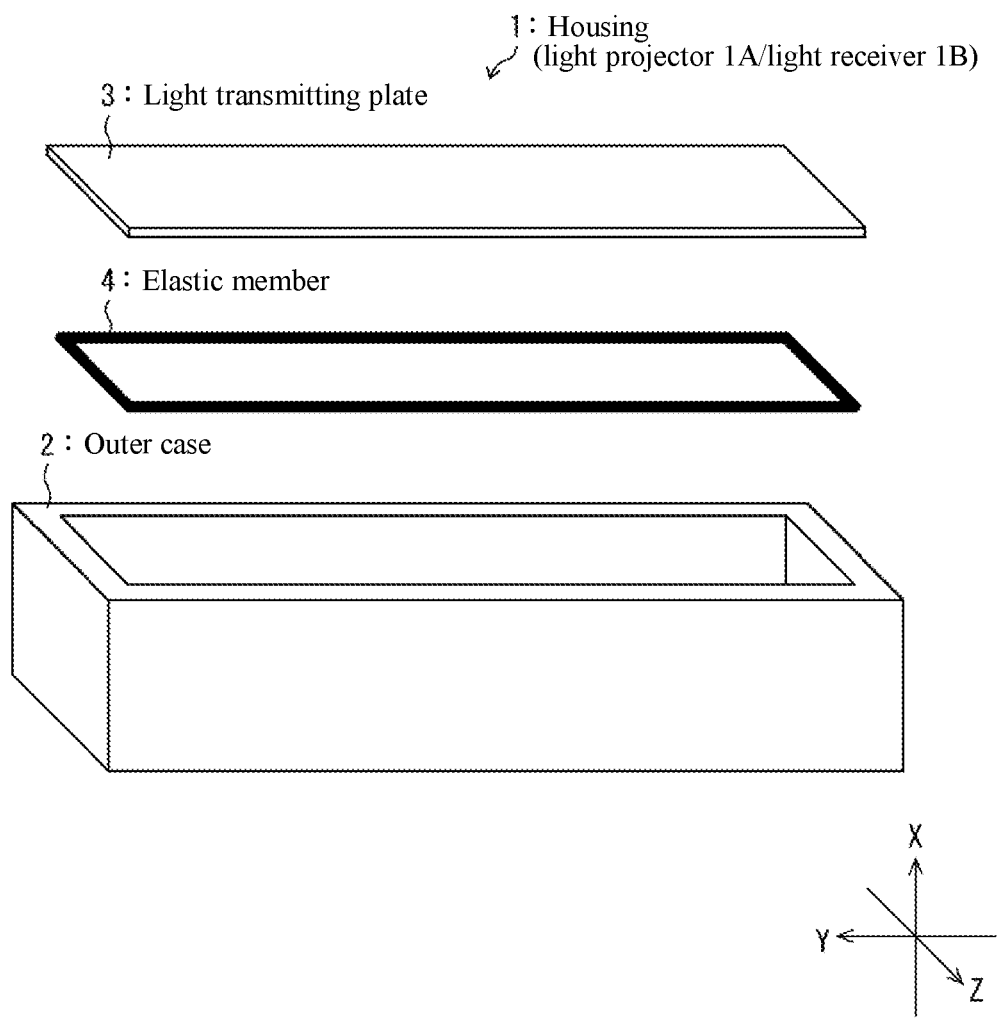
FIG. 3 is a perspective view showing a configuration outline of the housing in FIG. 1(A) and FIG. 1(B).

FIG. 3 is a perspective view showing a configuration outline of a housing 1 of the multi-optical axis photoelectric sensor 10. The light projector 1A and the light receiver 1B of the multi-optical axis photoelectric sensor 10 are respectively configured so that inside the longitudinal-shaped housing 1, an optical unit provided with a plurality of optical elements (light-emitting elements in the light projector 1A and light-receiving elements in the light receiver 1B), and a control board or the like are accommodated. As illustrated in FIG. 3, the housing 1 is configured by blocking an opened front surface of an outer case 2 (outer cases 2A and 2B) by a light transmitting plate 3 (light transmitting plates 3A and 3B). By making a light-projecting surface or a light-receiving surface of the optical unit in the housing 1 face the opened front surface, an opening of the front surface blocked by the light transmitting plate 3 functions as a window which transmits a light. In the housing 1, a string-shaped elastic member 4 is arranged between the opening of the outer case 2 and the light transmitting plate 3 corresponding to the shape of the opening of the outer case 2, and by pressing and fixing the light transmitting plate 3 to the elastic member 4, a gap between the outer case 2 and the light transmitting plate 3 is sealed by the elastic member 4.

Here, for the multi-optical axis photoelectric sensor 10, a structure is contrived to closely fix the light transmitting plate 3 to the outer case 2 in each of the light projector 1A and the light receiver 1B, that is, in the housing 1. That is, the multi-optical axis photoelectric sensor 10 stabilizes the sealing quality by preventing the elastic member 4 which seals the gap between the light transmitting plate 3 and the outer case 2 from being twisted. Besides, the multi-optical axis photoelectric sensor 10 facilitates a sealing design by setting the cross-sectional shape of "the part which seals the gap between the light transmitting plate 3 and the outer case 2 (a sealing part 41, the detail is described later using FIG. 4(A), FIG. 4(B) and FIG. 4(C))" of the elastic member 4 to a simple shape such as a circular shape (circle).

Figure 8:
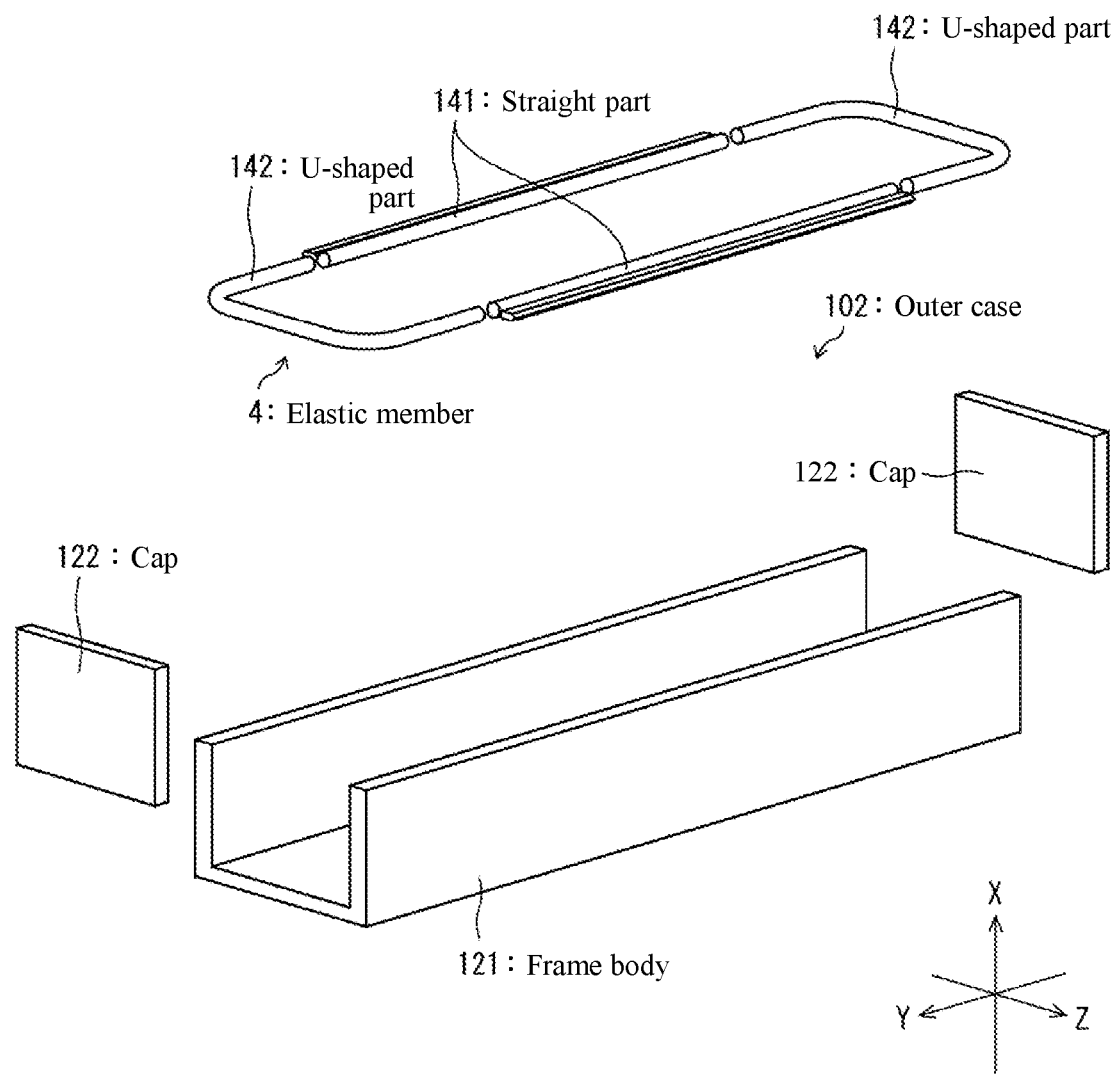
FIG. 8 is a perspective view showing an example of the outer case different from that shown in FIG. 2, and the elastic member shown in FIG. 7.

Furthermore, as illustrated in FIG. 8, the outer case included in the multi-optical axis photoelectric sensor 10 may be formed by a frame body 121 in which the front surface and two end surfaces are opened, and a pair of caps 122 which respectively block the two opened end surfaces of the frame body 121, and the detail is described later.

§ 2. Configuration Example

In order to facilitate the understanding about the multi-optical axis photoelectric sensor 10, in particular, to facilitate the understanding about the structure for "sealing the gap between the light transmitting plate 3 and the outer case 2" of the multi-optical axis photoelectric sensor 10, firstly, a conventional sealing structure between the light transmitting plate and the outer case is illustrated.

(Conventional Sealing Structure)

FIG. 12(A) and FIG. 12(B) is a drawing illustrating a conventional elastic member 99 and a conventional storage groove 98. As shown in FIG. 12(A), the conventional elastic member 99 is stored in the conventional storage groove 98 which is formed on the edge of a conventional outer case. By pressing and fixing the light transmitting plate 3 to the conventional elastic member 99, a gap between the conventional outer case and the light transmitting plate 3 is sealed by the conventional elastic member 99.

The conventional elastic member 99 is, for example, a rubber string having a substantially circular cross section; by arranging the elastic member 99 around the light transmitting plate 3 in a ring shape and connecting the two ends, the conventional elastic member 99 can correspond to the light transmitting plate 3 of various sizes, that is, can be arranged on the outer periphery of the light transmitting plate 3 of various sizes.

Here, as shown in FIG. 12(B), the molding method of rubber is broadly divided into extrusion molding and die molding, and the two methods are respectively characterized as below. That is, in regard to the extrusion molding, generally, a dimensional variation is large, and the control of compressibility involved in sealing is difficult; besides, an amount of cross-linked structures is less than the amount in the die molding, and permanent distortion is easily generated. In contrast, in regard to the die molding, generally, burrs are generated on a seam of the die, and when the burrs cut across the sealing surface, a gap is generated and the sealability is reduced.

In regard to the string-shaped conventional elastic member 99, the part corresponding to the straight part of the light transmitting plate 3 is twisted easily, and when the conventional elastic member 99 is molded by die molding, the burr generated on the surface of the conventional elastic member 99 may overlap with the sealing surface as illustrated in FIG. 12(A). Then, on the sealing surface, that is, between the light transmitting plate 3 and the conventional elastic member 99, and between the conventional elastic member 99 and the groove bottom of the conventional storage groove 98, a gap is generated when there are burrs generated on the surface of the conventional elastic member 99.

(Outline of Multi-Optical Axis Photoelectric Sensor of the Embodiment)

Therefore, it is prevented by the multi-optical axis photoelectric sensor 10 that, "the elastic member 4 is twisted in the storage groove 21, and the burr generated on the surface of the elastic member 4 goes between the light transmitting plate 3 and the elastic member 4, and between the elastic member 4 and a groove bottom 213 of the storage groove 21". The multi-optical axis photoelectric sensor 10 is illustrated specifically below using FIG. 1(A) and FIG. 1(B) and so on. In order to facilitate the understanding about the multi-optical axis photoelectric sensor 10, the outline of the multi-optical axis photoelectric sensor 10 is organized as below.

That is, the multi-optical axis photoelectric sensor 10 is a multi-optical axis photoelectric sensor in which the external shapes of the light projector 1A and the light receiver 1B are respectively formed by the housing 1 including the outer case 2 having the opened front surface and the light transmitting plate 3 for blocking the front surface. The housing 1 is provided with the storage groove 21 and the string-shaped elastic member 4, the storage groove 21 is arranged around the outer peripheral part of the outer case 2, and the string-shaped elastic member 4 is interposed between the outer case 2 and the light transmitting plate 3 in a state of being stored in the storage groove 21, and seals the gap between the outer case 2 and the light transmitting plate 3; at least a part of the side wall of the storage groove 21 is provided with a concave part 220 which is concave toward a direction different from a pressing direction from the light transmitting plate 3 to the elastic member 4, and the elastic member 4 includes a part arranged in the concave part 220.

According to the configuration, in the multi-optical axis photoelectric sensor 10, at least a part of the side wall of the storage groove 21 is provided with the concave part 220 which is concave in the direction different from the pressing direction from the light transmitting plate 3 to the elastic member 4, and the elastic member 4 includes the part arranged in the concave part 220. Then, by an interference of the inner wall of the concave part 220 provided on the side wall of the storage groove 21 and "the part arranged in the concave part 220 of the elastic member 4", the elastic member 4 is prevented from rotating in a direction perpendicular to a peripheral direction of the storage groove 21 in the storage groove 21.

Accordingly, the multi-optical axis photoelectric sensor 10 exhibits an effect of suppressing the occurrence of a situation in which "the elastic member 4 is sandwiched between the outer case 2 and the light transmitting plate 3 in the twisted state, and it is difficult to closely fix the light transmitting plate 3 to the outer case 2".

In the multi-optical axis photoelectric sensor 10, at least a part of the side wall of the storage groove 21 is provided with a projection part 22 which is convex toward another side wall, and the concave part 220 is formed by the projection part 22, the side wall of the storage groove 21, and the groove bottom 213 (the bottom surface) of the storage groove 21.

According to the above-mentioned configuration, in the multi-optical axis photoelectric sensor 10, at least a part of the side wall of the storage groove 21 is provided with the projection part 22 which is convex toward another side wall, and the concave part 220 is formed by the projection part 22, the side wall of the storage groove 21, and the groove bottom 213 of the storage groove 21. Then, by an interference of the projection part 22 and "the part arranged in the concave part 220 of the elastic member 4", the elastic member 4 is prevented from rotating in the direction perpendicular to the peripheral direction of the storage groove 21 in the storage groove 21.

Accordingly, the multi-optical axis photoelectric sensor 10 exhibits the effect of suppressing the occurrence of the situation in which "the elastic member 4 is sandwiched between the outer case 2 and the light transmitting plate 3 in the twisted state, and it is difficult to closely fix the light transmitting plate 3 to the outer case 2".

In the multi-optical axis photoelectric sensor 10, on at least a part of the elastic member 4, a sealing part 41 which is pressed to the groove bottom 213 (the bottom surface) of the storage groove 21 by the light transmitting plate 3, and a twist suppression part 42 which is not in contact with the light transmitting plate 3 and which is stored in the concave part 220 are integrally formed.

According to the above-mentioned configuration, in the multi-optical axis photoelectric sensor 10, on at least a part of the elastic member 4, the sealing part 41 and the twist suppression part 42 are integrally formed. Then, the sealing part 41 seals a gap between the outer case 2 and the light transmitting plate 3, and the twist suppression part 42 is stored in the concave part 220.

Accordingly, in the multi-optical axis photoelectric sensor 10, by an interference of the twist suppression part 42 and the inner wall of the concave part 220, "the twisting of the sealing part 41 in the storage groove 21" is prevented, and the sealing part 41 exhibits an effect of sealing the gap between the outer case 2 and the light transmitting plate 3.

In the multi-optical axis photoelectric sensor 10, the cross section of the sealing part 41 perpendicular to the extending direction of the elastic member 4 is substantially circular. According to the above-mentioned configuration, in the multi-optical axis photoelectric sensor 10, in the sealing part 41 which seals the gap between the outer case 2 and the light transmitting plate 3, the cross section perpendicular to the extending direction of the elastic member 4 is substantially circular. Accordingly, the multi-optical axis photoelectric sensor 10 exhibits the effect of sealing the gap between the outer case 2 and the light transmitting plate 3 by the sealing part 41 having the substantially circular cross section.

In the multi-optical axis photoelectric sensor 10, the twist suppression part 42 may include a part which is convex toward the inner wall of the concave part 220 (for example, the bottom of the concave part 220) in a state that the elastic member 4 is stored in the storage groove 21. According to the above-mentioned configuration, the multi-optical axis photoelectric sensor 10 exhibits an effect of easily storing the elastic member 4 in the storage groove 21, particularly, easily storing the twist suppression part 42 in the concave part 220.

(Detail of Multi-Optical Axis Photoelectric Sensor of the Embodiment)

Figure 1B:
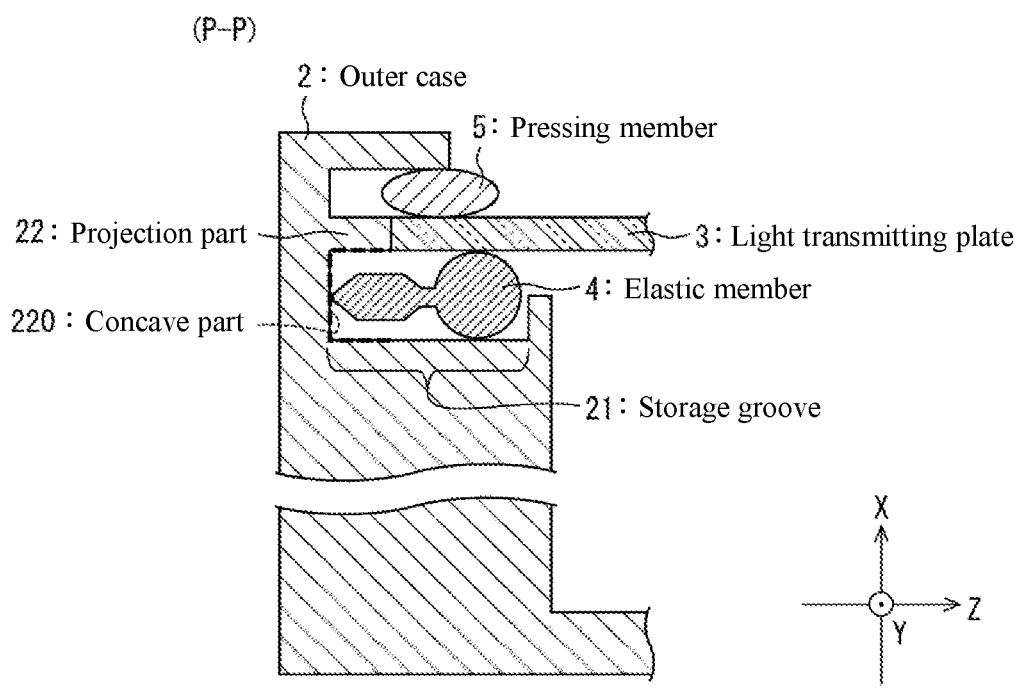

FIG. 1(A) and FIG. 1(B) is a drawing illustrating an outline and the shape of major parts of the housing 1 (the light projector 1A and the light receiver 1B). As illustrated in FIG. 1(A), the housing 1 (the light projector 1A and the light receiver 1B) is configured by blocking the opened front surface of the outer case 2 by the light transmitting plate 3, and FIG. 1(B) corresponds to a PP cross-sectional view in FIG. 1(A).

As illustrated in FIG. 1(B), the storage groove 21 is arranged around the edge of the outer case 2 (an outer peripheral part); for example, the storage groove 21 is formed on the top inner side of the wall plate of the outer case 2 over the entire periphery edge. Besides, on the side wall of the outer side (a side separated from the center of the outer case 2) of the storage groove 21, the projection part 22 is arranged. In the storage groove 21, for example, the elastic member 4 which is a string made of rubber is stored, and the edge of the light transmitting plate 3 is supported by the edge of the outer case 2 via the elastic member 4. Then, between the edge of the light transmitting plate 3 and the convex part arranged on the top end of the edge of the outer case 2 (a stop plate 23 in FIG. 4(B)), a rod-like pressing member 5 for example is inserted to press the light transmitting plate 3.

Figure 4A:
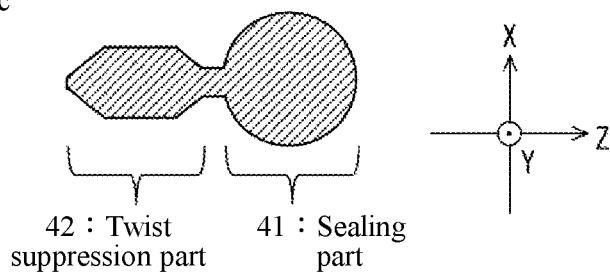
FIG. 4(A), FIG. 4(B) and FIG. 4(C) is a cross-sectional view illustrating details of an elastic member and a storage groove provided on the housing in FIG. 1(A) and FIG. 1(B).
Figure 4B:
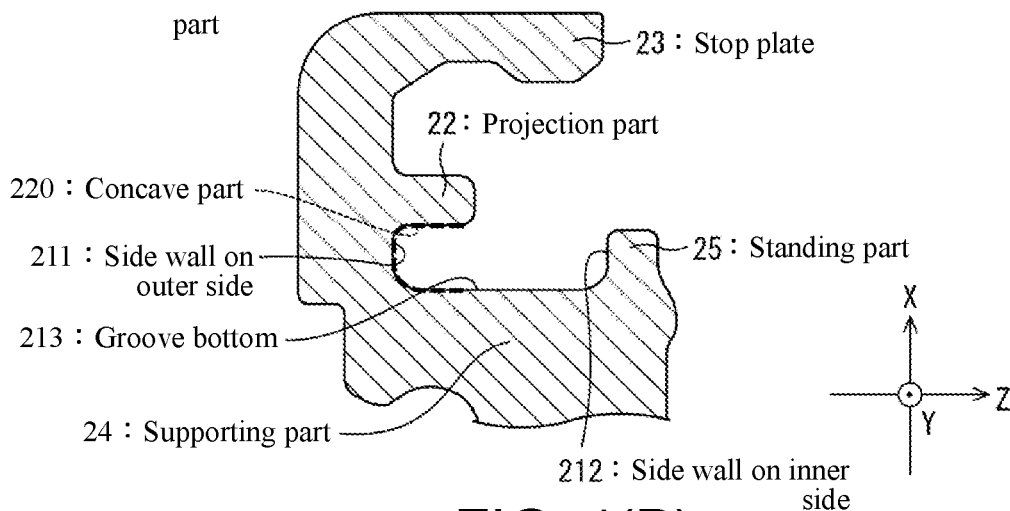
Figure 4C:
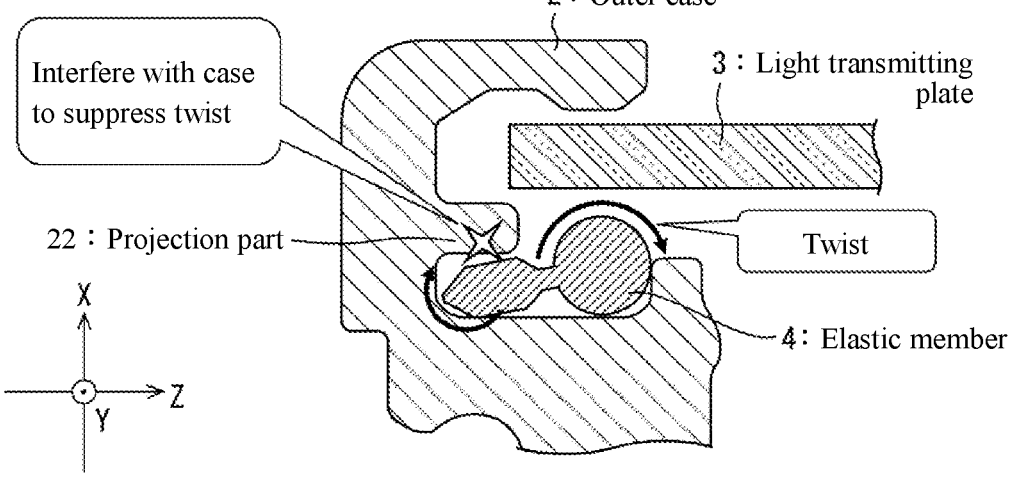

FIG. 4(A), FIG. 4(B) and FIG. 4(C) is a cross-sectional view illustrating details of the elastic member 4 and the storage groove 21. FIG. 4(A) is a drawing illustrating the shape of the cross section perpendicular to the extending direction of the elastic member 4 which is a string made of rubber for example. As illustrated in FIG. 4(A), on at least a part of the elastic member 4, the sealing part 41 and the twist suppression part 42 are formed integrally. The cross section of the sealing part 41 perpendicular to the extending direction of the elastic member 4 is substantially circular, and the cross section of the twist suppression part 42 has an oblong polygonal shape relative to the pressing direction (a hexagonal shape in the example shown in FIG. 4(A)). The twist suppression part 42 has a convex shape, and the convex shape is formed to be convex toward the side wall on the outer side of the storage groove 21 when the elastic member 4 is stored in the storage groove 21.

FIG. 4(B) is a drawing illustrating details of the edge of the outer case 2 including the storage groove 21. The front surface of the outer case 2 is opened to leave the belt-shaped stop plate 23 on the inner side of the edge (the outer peripheral part), that is, on the edge of the outer case 2, the stop plate 23 which is convex toward the inner side of the outer case 2 is formed over the entire periphery. In other words, on the top end inner side of the wall plate of the outer case 2, the stop plate 23 which is convex toward the inner side of the outer case 2 is formed over the entire periphery of the edge.

On the inner side top of the wall plate of the outer case 2, a longitudinal-shaped supporting part 24 is formed along the edge of the outer case 2 over the entire periphery of the edge. On the side edge of the inner side (the central side of the outer case 2) of the supporting part 24, a standing part 25 is formed, and the storage groove 21 is formed by the wall plate of the outer case 2, the supporting part 24, and the standing part 25. That is, the storage groove 21 shown in FIG. 1(B) is arranged around the edge (the outer peripheral part) of the outer case 2.

A side wall 211 on the outer side (the side separated from the center of the outer case 2, that is, the left side on the paper surface) of the storage groove 21 is formed by the wall plate of the outer case 2, a side wall 212 on the inner side (the right side on the paper surface) of the storage groove 21 is formed by the standing part 25, and a groove bottom 213 of the storage groove 21 is formed by the supporting part 24. Besides, at least a part of the side wall 211 on the outer side of the storage groove 21 is provided with the projection part 22 which is convex toward the inner side. Furthermore, at least a part of the side wall 212 on the inner side of the storage groove 21 may be provided with the projection part 22 which is convex toward the outer side.

FIG. 4(C) is a drawing illustrating a state that the elastic member 4 is stored in the storage groove 21. The string-shaped elastic member 4 is stored in the storage groove 21, the edge of the light transmitting plate 3 is supported by the supporting part 24 via the elastic member 4, and the pressing member 5 shown in FIG. 1(B) is inserted between the edge of the light transmitting plate 3 and the stop plate 23 to press the light transmitting plate 3. Specifically, the sealing part 41 of the elastic member 4 is pressed to the groove bottom 213 (the bottom surface) of the storage groove 21 by the light transmitting plate 3, and seals the gap between the light transmitting plate 3 and the outer case 2.

Besides, when the elastic member 4 stored in the storage groove 21 is about to be twisted in the storage groove 21, the twist suppression part 42 of the elastic member 4 and the projection part 22 of the storage groove 21 interfere (=collide) with each other, and the elastic member 4 is prevented from being twisted (rotating in the direction perpendicular to the extending direction).

As illustrated in FIG. 4(A), FIG. 4(B) and FIG. 4(C), in the multi-optical axis photoelectric sensor 10, the elastic member 4 (for example, the rubber) includes the sealing part 41 and the twist suppression part 42 (FIG. 4(A)). Besides, on the side surface of the storage groove 21 (=the side wall 211) of the outer case 2, the projection part 22 is arranged. When the elastic member 4 is about to be twisted in the storage groove 21, the twist is prevented by the interference of the twist suppression part 42 and the projection part 22.

The multi-optical axis photoelectric sensor 10 adopts the following structure for the elastic member 4, in which the sealing part 41 and the twist suppression part 42 are functionally separated, and the twist suppression part 42 is not involved in the sealing between the light transmitting plate 3 and the outer case 2. However, as described later using FIG. 11(A) and FIG. 11(B) and so on, the multi-optical axis photoelectric sensor 10 may adopt the elastic member 4 in which the sealing part 41 and the twist suppression part 42 are functionally separated and visually integrally formed.

(Contrivance on Storage of Elastic Member in Corner Part of Outer Case 2)

Figure 5A:
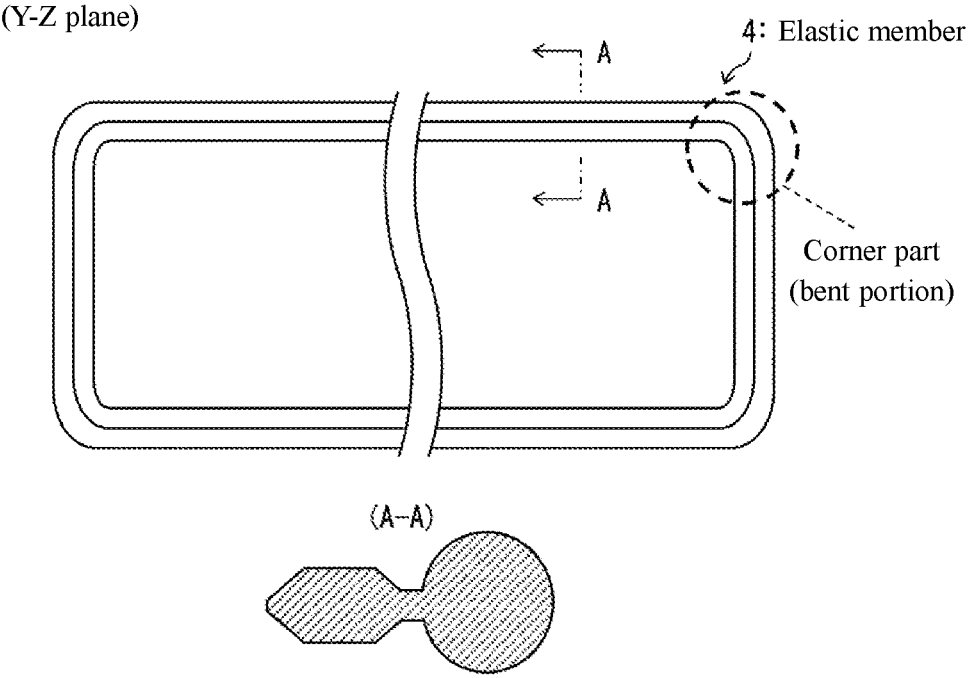
FIG. 5(A) and FIG. 5(B) is a plan view showing an example of the elastic member shown in FIG. 4(A), FIG. 4(B) and FIG. 4(C).
Figure 5B:
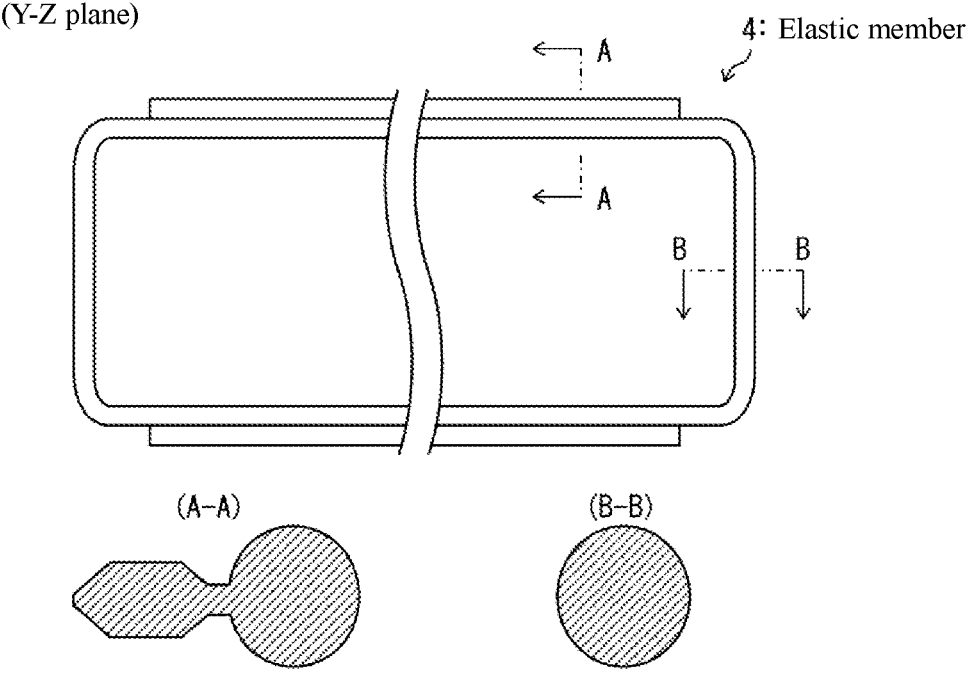

FIG. 5(A) and FIG. 5(B) is a plan view showing an example of the elastic member 4. As mentioned above, the string-shaped elastic member 4 is stored in the storage groove 21 which is arranged around the outer peripheral part of the outer case 2 (the edge, the top end inner side of the wall plate of the outer case 2). Then, on at least a part of the elastic member 4, the sealing part 41 and the twist suppression part 42 are formed integrally.

Here, as illustrated in FIG. 5(A), in the string-shaped elastic member 4, the sealing part 41 having a substantially circular cross section, and the twist suppression part 42 having an oblong polygonal-shaped cross section may be formed internally over the entire length in the extending direction. Besides, as illustrated in FIG. 5(B), the shape may be that in the elastic member 4 stored in the storage groove 21 which is formed in the corner part (a bent portion) of the outer case 2, only the sealing part 41 is formed and the twist suppression part 42 is not formed.

That is, in the elastic member 4 illustrated in FIG. 5(A), the sealing part 41 and the twist suppression part 42 are formed integrally over the entire length in the extending direction (=the peripheral direction), and the shapes of the cross sections perpendicular to the extending direction are the same over the entire length in the extending direction. The shape of the cross section perpendicular to the extending direction of the elastic member 4 illustrated in FIG. 5(A) is, over the entire length in the extending direction, a shape illustrated as an AA cross section in FIG. 5(A) in which "the sealing part 41 and the twist suppression part 42 are formed integrally".

In the elastic member 4 illustrated in FIG. 5(B), on the part stored in the storage groove 21 which is formed in a straight part (a linear part) of the outer case 2, the sealing part 41 and the twist suppression part 42 are formed integrally. In contrast, on the part stored in the storage groove 21 which is formed in the corner part of the outer case 2, only the sealing part 41 is formed and the twist suppression part 42 is not formed or the twist suppression part 42 is removed. Accordingly, the shape of the cross section perpendicular to the extending direction of the elastic member 4 illustrated in FIG. 5(B) is the shape illustrated as the AA cross section or the BB cross section in FIG. 5(B). That is, the shape of the cross section of "the part stored in the storage groove 21 which is formed in the straight part of the outer case 2" of the elastic member 4 illustrated in FIG. 5(B) is the shape illustrated as the AA cross section, in which "the sealing part 41 and the twist suppression part 42 are formed integrally". Besides, the shape of the cross section of "the part stored in the storage groove 21 which is formed in the corner part of the outer case 2" of the elastic member 4 illustrated in FIG. 5(B) is the shape illustrated as the BB cross section in which "only the sealing part 41 is formed and the twist suppression part 42 is not formed".

As illustrated in FIG. 5(B), in the multi-optical axis photoelectric sensor 10, in the elastic member 4 stored in the storage groove 21 which is formed in the corner part of the outer case 2, the sealing part 41 is formed and the twist suppression part 42 may not be formed.

According to the above-mentioned structure, in the multi-optical axis photoelectric sensor 10, in the elastic member 4 stored in the storage groove 21 which is formed in the corner part of the outer case 2, the sealing part 41 is formed and the twist suppression part 42 is not formed.

Here, when the twist suppression part 42 is formed in the elastic member 4 stored in the storage groove 21 in the corner part, the elastic member 4 emerges from the storage groove 21 and easily falls out of the storage groove 21. Therefore, in the elastic member 4 stored in the storage groove 21 in the corner part, the twist suppression part 42 is not formed.

Accordingly, the multi-optical axis photoelectric sensor 10 exhibits an effect of preventing the elastic member 4 from emerging from the storage groove 21 and falling out of the storage groove 21, and of sealing the gap between the outer case 2 and the light transmitting plate 3 by the elastic member 4.

Figure 6A:
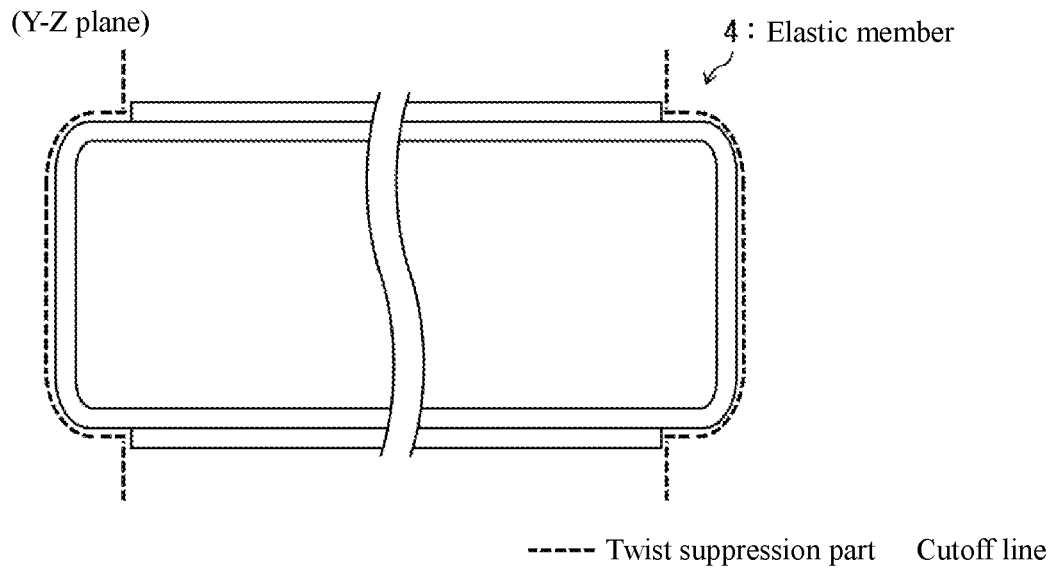
FIG. 6(A) and FIG. 6(B) is a plan view showing a formation example of an elastic member in which a twist suppression part is partially removed.
Figure 6B:
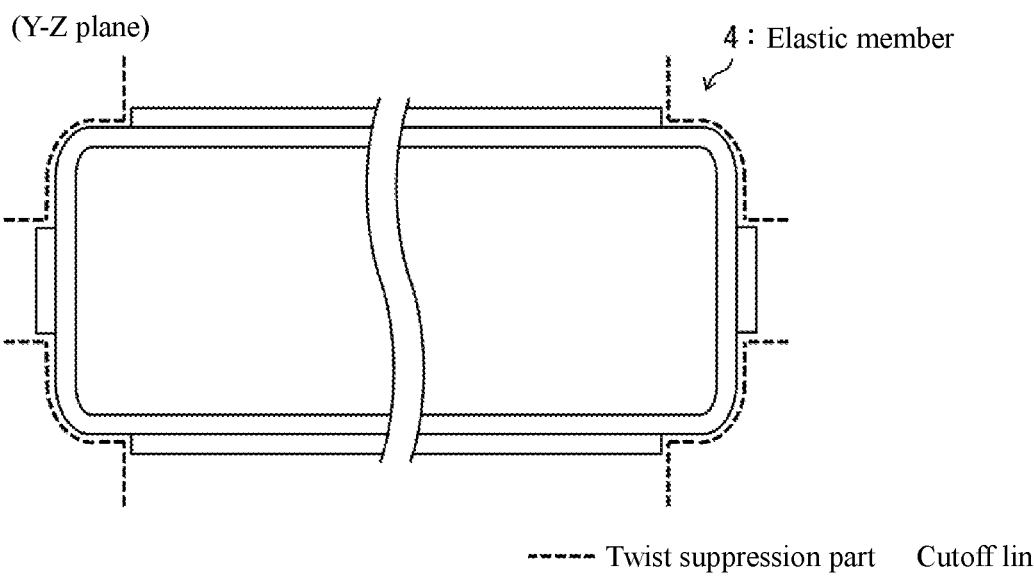

FIG. 6(A) and FIG. 6(B) is a plan view showing a formation example of the elastic member in which the twist suppression part 42 is partially removed. "The elastic member 4 in which the twist suppression part 42 is partially removed" as illustrated in FIG. 5(B) can be formed, for example, by the method shown in FIG. 6(A) and FIG. 6(B). In FIG. 6(A) and FIG. 6(B), a cutoff line is shown by a dotted line, along which the twist suppression part 42 is cut off.

In regard to the elastic member 4 illustrated in FIG. 5(A), in which the sealing part 41 and the twist suppression part 42 are formed integrally over the entire length in the extending direction (=the peripheral direction), the twist suppression part 42 can be partially removed by being cut off along the cutoff line illustrated in FIG. 6(A).

By being cut off along the cutoff line illustrated in FIG. 6(A), the elastic member 4 has a shape in which only in the part corresponding to "the straight part in the longitudinal direction of the front surface of the outer case 2", "the sealing part 41 and the twist suppression part 42 are formed integrally". By being cut off along the cutoff line illustrated in FIG. 6(A), in the parts corresponding to "the corner part of the front surface of the outer case 2" and "the straight part in a transverse direction of the front surface of the outer case 2" of the elastic member 4, only the sealing part 41 is formed and the twist suppression part 42 is not formed. That is, the twist suppression part 42 is cut (the twist suppression part 42 is removed) from the parts corresponding to "the corner part of the front surface of the outer case 2" and "the straight part in a transverse direction of the front surface of the outer case 2" of the elastic member 4.

In regard to the elastic member 4 illustrated in FIG. 5(A), in which the sealing part 41 and the twist suppression part 42 are formed integrally over the entire length in the extending direction (=the peripheral direction), the twist suppression part 42 can be partially removed by being cut off along the cutoff line illustrated in FIG. 6(B).

By being cut off along the cutoff line illustrated in FIG. 6(B), the elastic member 4 has a shape in which only in the parts corresponding to "the straight part in the longitudinal direction" and "the straight part in the transverse direction" of the front surface of the outer case 2, "the sealing part 41 and the twist suppression part 42 are formed integrally". By being cut off along the cutoff line illustrated in FIG. 6(B), in the part corresponding to "the corner part of the front surface of the outer case 2" of the elastic member 4, only the sealing part 41 is formed and the twist suppression part 42 is not formed. That is, the twist suppression part 42 is cut (the twist suppression part 42 is removed) from the part corresponding to "the corner part of the front surface of the outer case 2" of the elastic member 4.

By cutting off (removing) the twist suppression part 42 with the cutoff line shown by the dotted lines in FIG. 6(A) and FIG. 6(B), the elastic member 4 stored in the storage groove 21 can be prevented from waving in "the corner part of the front surface of the outer case 2", or falling out of the storage groove 21.

Figure 7:
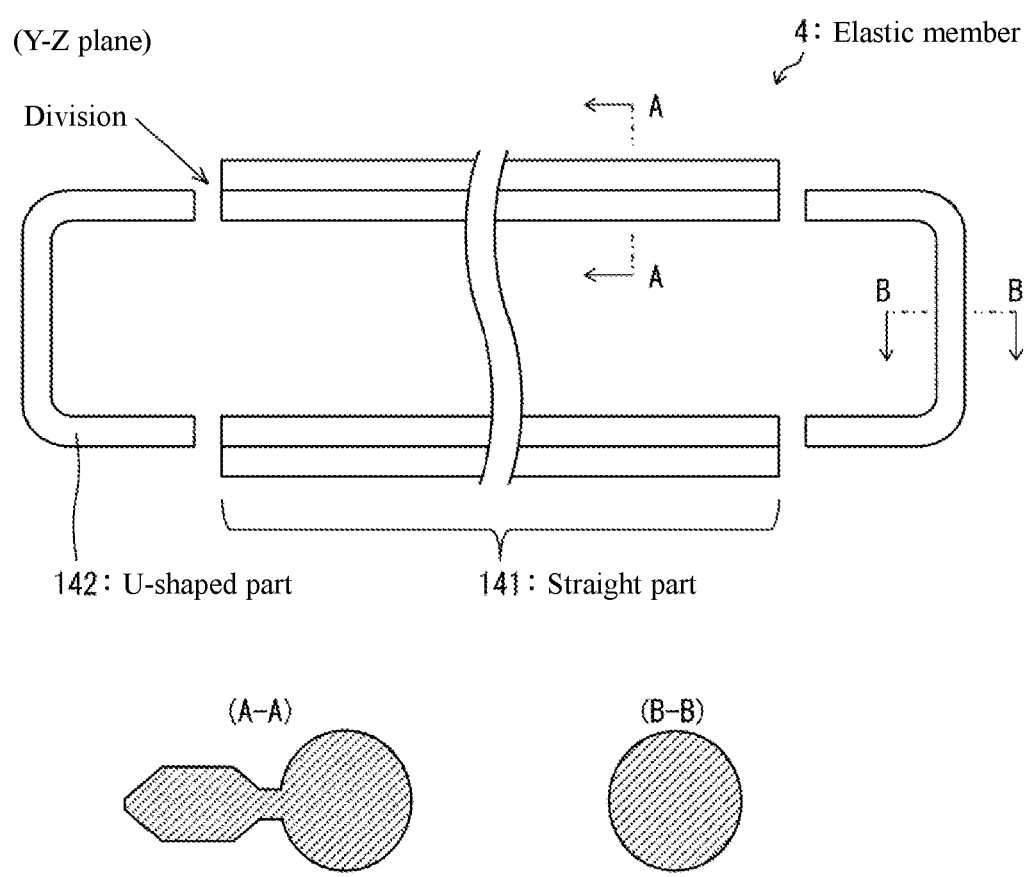
FIG. 7 is a plan view showing an example of the elastic member different from that shown in FIG. 5(A) and FIG. 5(B).

FIG. 7 is a plan view showing an example of the elastic member 4 different from that shown in FIG. 5(A) and FIG. 5(B). The above-described elastic member 4 is "stored in the storage groove 21 which is arranged around the outer peripheral part of the outer case 2, and connects two ends of one string-shaped rubber". However, it is not necessary that the elastic member 4 is configured to "connect two ends of one string-shaped rubber"; for example, as illustrated in FIG. 7, one elastic member 4 may be formed by connecting a plurality of "string-shaped rubbers".

That is, two straight parts 141 and two U-shaped parts 142 may be alternately connected in the peripheral direction to form the elastic member 4 "stored in the storage groove 21 which is arranged around the outer peripheral part of the outer case 2. Each of the straight parts 141 and the U-shaped parts 142 can be realized, for example, by the rubber string.

The straight parts 141 are stored in the storage groove 21 that is formed in the straight part (the linear part) of the outer case 2, and the U-shaped parts 142 are stored in the storage groove 21 that is formed in the corner part of the outer case 2. The shape of the cross section perpendicular to the extending direction of the straight parts 141 is a shape shown by the AA cross-sectional view, in which "the sealing part 41 and the twist suppression part 42 are formed integrally". The shape of the cross section perpendicular to the extending direction of the U-shaped parts 142 is a shape shown by the BB cross-sectional view, in which "only the sealing part 41 is formed and the twist suppression part 42 is not formed".

As described above using FIG. 7, in the multi-optical axis photoelectric sensor 10, the elastic member 4 (the straight parts 141) stored in the storage groove 21 that is formed in the straight part of the outer case 2, and the elastic member 4 (the U-shaped parts 142) stored in the storage groove 21 that is formed in the corner part of the outer case 2 may be separable.

According to the above-described structure, in the multi-optical axis photoelectric sensor 10, the elastic member 4 stored in the storage groove 21 that is formed in the straight part of the outer case 2, and the elastic member 4 stored in the storage groove 21 that is formed in the corner part of the outer case 2 are separable.

Accordingly, the multi-optical axis photoelectric sensor 10 exhibits an effect of easily storing the elastic member 4 in the storage groove 21, compared with the elastic member in which the part stored in the storage groove 21 of the straight part and the part stored in the storage groove 21 of the corner part are formed integrally.

FIG. 8 is a perspective view showing an example of the outer case 102 and the elastic member 4 shown in FIG. 7. In the description above, the example of using the substantially rectangular parallelepiped outer case 2 with the opened front surface to form the housing 1 (the light projector 1A and the light receiver 1B) is described. It is not necessary that the shape of the outer case forming the housing 1 is substantially rectangular parallelepiped with the opened front surface, and the housing 1 may be formed using the outer case 102 illustrated in FIG. 8. That is, the housing 1 may use the outer case 2 which is formed integrally, or use the outer case 102 which is formed by a plurality of components.

The outer case 102 illustrated in FIG. 8 is formed by the frame body 121 in which the front surface and two end surfaces are opened, and a pair of caps 122 which respectively block the two opened end surfaces of the frame body 121. On each of the inner surfaces of two side plates of the frame body 121, longitudinal-shaped supporting parts 24 which extend along the side edge corresponding to the opening of the front surface are formed; besides, on the inner side of the caps 122, a communication part connected to each of the two supporting parts 24 of the frame body 121 is formed. Then, the string-shaped elastic member 4 is arranged so as to circle a closed-loop formed by the supporting parts 24 of the two side plates of the frame body 121 and the communication part of the caps 122.

Particularly, as illustrated in FIG. 8, in the outer case 102, the U-shaped parts 142 of the elastic member 4 illustrated in FIG. 7 may be stored in the communication part of the caps 122 and the storage groove 21 of the supporting parts 24 of the frame body 121. Besides, the straight parts 141 of the elastic member 4 illustrated in FIG. 7 may be stored in the storage groove 21 of the supporting parts 24 of the frame body 121.

When the elastic member 4 stored in the storage groove 21 of "the corner part of the outer case 2 (or the outer case 102)" is provided with the twist suppression part 42, the twist suppression part 42 bulges due to a reaction force at the time of compression, and the elastic member 4 easily falls out of the storage groove 21. Therefore, as illustrated using FIG. 5(A) to FIG. 8, in regard to the elastic member 4 surrounding the light transmitting plate 3 which is a sensor optical surface, in "the corner part of the outer case 2 (or the outer case 102)", the multi-optical axis photoelectric sensor 10 may separate (remove) the twist suppression part 42 from the sealing part 41. Furthermore, in regard to the elastic member 4 corresponding to "the corner part of the outer case 2", the multi-optical axis photoelectric sensor 10 may not arrange the twist suppression part 42 from the beginning.

In order to prevent the elastic member 4 from falling out of the storage groove 21 of "the corner part of the outer case 2 (or the outer case 102)", the multi-optical axis photoelectric sensor 10 may adopt the elastic member 4 illustrated in FIG. 7. That is, the multi-optical axis photoelectric sensor 10 may join the divided straight parts 141 and the U-shaped parts 142 to form the elastic member 4, and include the twist suppression part 42 only in the straight parts 141.

(Contrivance on Shape of Elastic Member)

Figure 9:
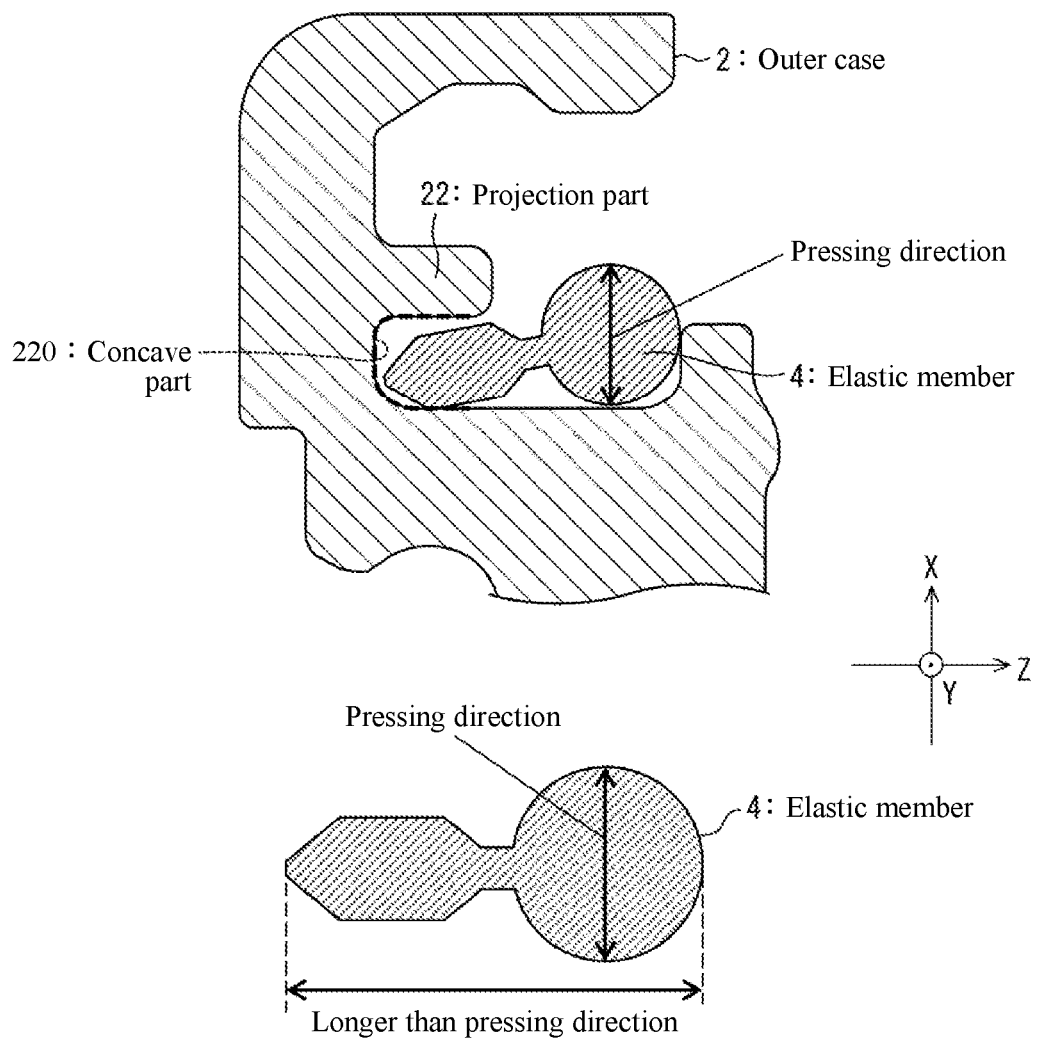
FIG. 9 is a drawing illustrating the contrivance in the shape of the elastic member.

FIG. 9 is a drawing illustrating the contrivance on the shape of the elastic member 4. As illustrated in FIG. 9, in regard to at least a part of the elastic member 4, in the cross section perpendicular to the extending direction of the elastic member 4, the length in the direction perpendicular to the pressing direction is longer than the length in the pressing direction (direction from the top to the bottom of the paper surface) from the elastic member 4 to the light transmitting plate 3.

By having the above-described cross-sectional shape, the elastic member 4 can be prevented from rotating in the storage groove 21 of the outer case 2 in "the direction perpendicular to the peripheral direction of the storage groove 21 (=the extending direction of the elastic member 4)", that is, the elastic member 4 can be prevented from being twisted in the storage groove 21 of the outer case 2.

Furthermore, the projection part 22 arranged in the storage groove 21 of the outer case 2 prevents the rotation (twist) of the elastic member 4 in the storage groove 21. That is, in the concave part 220 formed by the projection part 22, the side wall 211 (the wall plate of the outer case 2) on the outer side of the storage groove 21, and the groove bottom 213 (=the supporting parts 24) of the storage groove 21, the twist suppression part 42 of the elastic member 4 is stored. The concave part 220 is an area surrounded by the lower surface of the projection part 22, the inner side surface of the wall plate of the outer case 2, and the upper surface of the supporting parts 24.

When the elastic member 4 is about to be twisted in the storage groove 21, the twist suppression part 42 of the elastic member 4 and the projection part 22 of the storage groove 21 interfere with each other and the elastic member 4 is prevented from being twisted (rotating in the direction perpendicular to the extending direction). Furthermore, the concave part 220 may be formed so that the cross section perpendicular to the peripheral direction of the storage groove 21 (=the extending direction of the elastic member 4) is concave in a direction different from the pressing direction from the light transmitting plate 3 to the elastic member 4, for example, formed so that the cross section is concave toward the outer side of the outer case 2. That is, on at least a part of the storage groove 21, the concave part 220 for storing the twist suppression part 42 is formed, and the cross section of the concave part 220 perpendicular to the peripheral direction of the storage groove 21 has a concave shape in a direction different from the direction in which the elastic member 4 is pressed.

As described above, in the multi-optical axis photoelectric sensor 10, in regard to at least a part of the elastic member 4, in the cross section perpendicular to the extending direction of the elastic member 4, the length in the direction perpendicular to the pressing direction is longer than the length in the pressing direction from the light transmitting plate 3 to the elastic member 4.

According to the above-described structure, in the multi-optical axis photoelectric sensor 10, in regard to at least a part of the elastic member 4, in the cross section perpendicular to the extending direction of the elastic member 4, the length in the direction perpendicular to the pressing direction is longer than the length in the pressing direction from the light transmitting plate 3 to the elastic member 4.

Accordingly, the multi-optical axis photoelectric sensor 10 exhibits the effect of preventing the elastic member 4 from rotating in the storage groove 21 in the direction perpendicular to the peripheral direction of the storage groove 21, that is, preventing the elastic member 4 from being sandwiched between the outer case 2 and the light transmitting plate 3 in the twisted state.

§ 3. Variation

Figure 10:
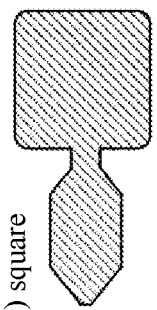
FIG. 10 is a table illustrating an example of the cross-sectional shape of the elastic member.

FIG. 10 is a table illustrating an example of the cross-sectional shape of the elastic member 4. In the description above, in regard to the sealing part 41 of the elastic member 4, the example is described in which the shape of the cross section perpendicular to the extending direction of the elastic member 4 is a round shape (substantially circular shape), but it is not necessary that the shape of the cross section of the sealing part 41 is the round shape. As shown in the first line of the table in FIG. 10, in regard to the sealing part 41 of the elastic member 4, the shape of the cross section perpendicular to the extending direction of the elastic member 4 may be, for example, a square shape (a substantially rectangular shape), and may be a triangular shape or a polygonal having five or more sides.

Besides, as described above, in the elastic member 4, the sealing part 41 and the twist suppression part 42 may be detached (see FIG. 6(A) and FIG. 6(B) and so on), that is, as shown on the second line in the table in FIG. 10, the twist suppression part 42 may adopt a structure capable of being processed separately from the sealing part 41. In other words, a part of the elastic member 4 may has a shape in which only the sealing part 41 is included and the twist suppression part 42 is not included, or the twist suppression part 42 may be removed (see FIG. 6(A) and FIG. 6(B)) from the part of the elastic member 4 in which the sealing part 41 and the twist suppression part 42 are formed integrally over the entire length. In the elastic member 4, the sealing part 41 is necessarily arranged over the entire length (the entire periphery) of the elastic member 4 in order to seal the gap between the light transmitting plate 3 and the outer case 2; in contrast, the twist suppression part 42 which prevents the twist of the elastic member 4 may be arranged in a part of the entire length of the elastic member 4.

Furthermore, in the elastic member 4, a C-surface may be formed on the twist suppression part 42 in order to improve the insertability (for example, the insertability to the concave part 220 illustrated in FIG. 9). When the elastic member 4 is stored in the storage groove 21, chamfering may be applied to "a surface facing the side wall on the outer side of the storage groove 21" of the twist suppression part 42, or "the surface facing the side wall on the outer side of the storage groove 21" of the twist suppression part 42 may be formed into a convex shape. On the third line of the table in FIG. 10, in regard to the twist suppression part 42 without the C-surface and the twist suppression part 42 with the C-surface, the shape of the cross section perpendicular to the extending direction of the elastic member 4 is illustrated. That is, as the twist suppression part 42 with the C-surface, the twist suppression part 42 may include a part which is convex toward the outer side of the outer case 2 in a state that the elastic member 4 is stored in the storage groove 21.

As shown on the third line of the table in FIG. 10, in the multi-optical axis photoelectric sensor 10, the twist suppression part 42 includes the part which is convex toward the outer side of the outer case 2 in a state that the elastic member 4 is stored in the storage groove 21, that is, the surface toward the outer side of the outer case 2 may be chamfered.

Figure 11A:
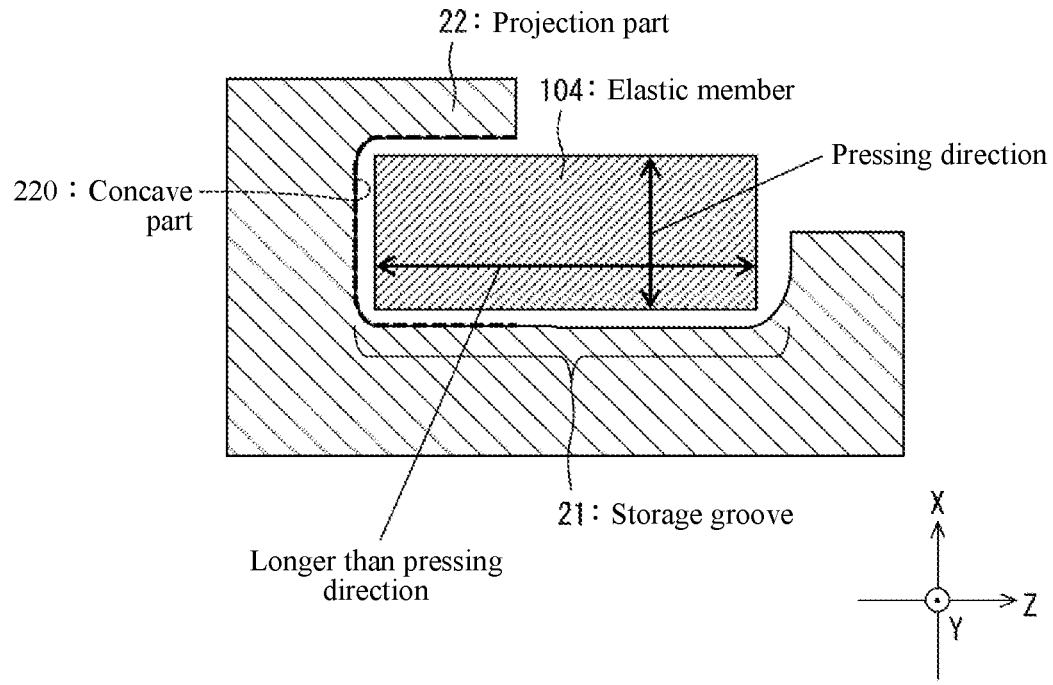
FIG. 11(A) and FIG. 11(B) is a drawing showing another example of the cross-sectional shape of the elastic member other than the example shown in FIG. 10.
Figure 11B:
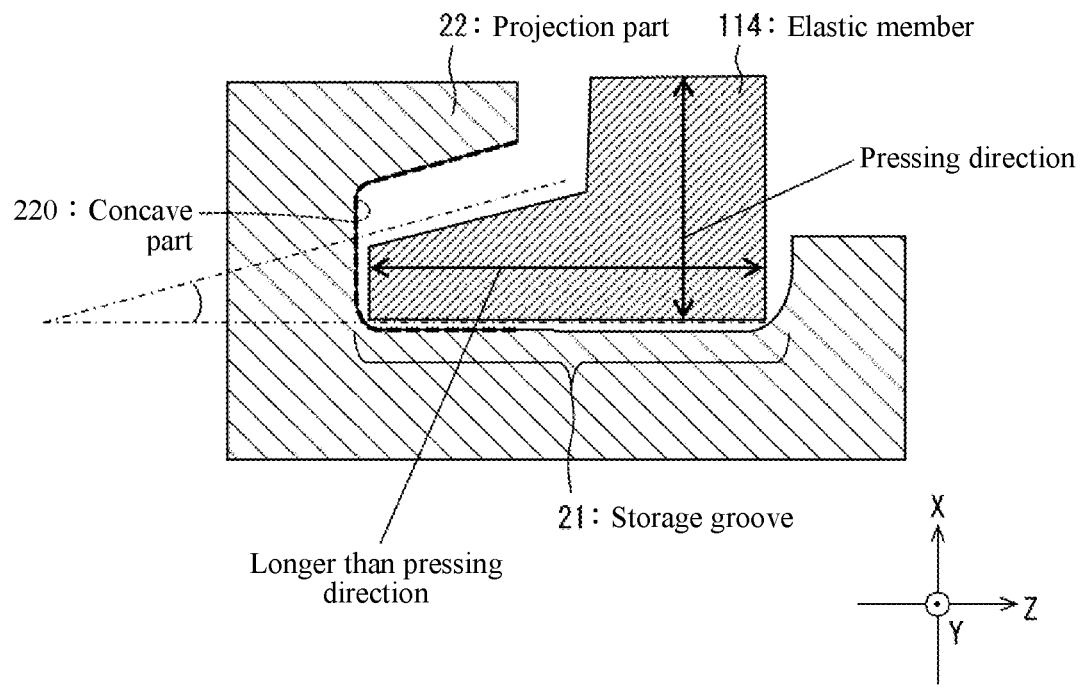

FIG. 11(A) and FIG. 11(B) is a drawing showing an example of the cross-sectional shape of the elastic member 4 other than the example shown in FIG. 10. In the description above, in regard to the elastic member 4, the functional separation of the sealing part 41 "which is pressed by the light transmitting plate 3 and seals the gap between the light transmitting plate 3 and the outer case 2", and the twist suppression part 42 "which is not pressed by the light transmitting plate 3 and interferes with the projection part 22 to prevent the twist of the elastic member 4" is illustrated. However, the multi-optical axis photoelectric sensor 10 may adopt the elastic member 4 having a shape in which the sealing part 41 and the twist suppression part 42 are functionally separated but visually indistinguishable. That is, in regard to at least a part of the elastic member 4, in the cross section perpendicular to the extending direction of the elastic member 4, the length in the direction perpendicular to the pressing direction may be longer than the length in the pressing direction from the light transmitting plate 3 to the elastic member 4, and the sealing part 41 and the twist suppression part 42 may be visually integral.

For example, as illustrated in FIG. 11(A), the multi-optical axis photoelectric sensor 10 may adopt the elastic member 104 in which the cross section perpendicular to the extending direction of the elastic member 104 has a rectangular shape. The elastic member 104 is a flat string made of rubber; in a state of being stored in the storage groove 21, the cross section perpendicular to the extending direction of the elastic member 104 has an oblong rectangular shape, in which the length in the direction perpendicular to the pressing direction is longer than the length in the pressing direction from the light transmitting plate 3 to the elastic member 4. The elastic member 104 has a shape in which the sealing part 41 "which is pressed by the light transmitting plate 3 and seals the gap between the light transmitting plate 3 and the outer case 2", and the twist suppression part 42 "which is not pressed by the light transmitting plate 3 and interferes with the projection part 22 to prevent the twist of the elastic member 4" are visually indistinguishable. In the elastic member 104, the sealing part 41 and the twist suppression part 42 are functionally separated, but the two are indistinguishable in appearance, and both of them are realized as a part of the flat string made of rubber. One part of the elastic member 104 is pressed by the light transmitting plate 3 and seals the gap between the light transmitting plate 3 and the outer case 2, and the other part is not pressed by the light transmitting plate 3 and interferes with the projection part 22 to prevent the twist of the elastic member 4.

The multi-optical axis photoelectric sensor 10 may adopt an elastic member 114 in which one side surface of the elastic member 104 which is a flat string made of rubber is formed into a convex shape toward the outer side. As illustrated in FIG. 11(B), the elastic member 114 includes a part which is convex toward the outer side of the outer case 2 in a state that the elastic member 114 is stored in the storage groove 21. The elastic member 114 is a flat string made of rubber in which one side surface is convex on the outer side; in a state that the elastic member 114 is stored in the storage groove 21, the cross section perpendicular to the extending direction has a shape in which the length in the direction perpendicular to the pressing direction is longer than the length in the pressing direction from the light transmitting plate 3 to the elastic member 4.

In FIG. 11(B), the cross section perpendicular to the extending direction of the elastic member 114 stored in the storage groove 21 includes a part which is convex toward the side wall on the outer side (the side separated from the center of the outer case 2) of the storage groove 21, and is inclined relative to the side wall on the outer side of the storage groove 21. Accordingly, the lower surface of the projection part 22 of the storage groove 21 is also inclined relative to the side wall of the outer side of the storage groove 21. In other words, in "the concave part 220 formed by the projection part 22, the side wall 211 (the wall plate of the outer case 2) on the outer side of the storage groove 21, and the groove bottom 213 (=the supporting parts 24) of the storage groove 21" illustrated in FIG. 9, the lower surface of the projection part 22 may be inclined relative to the side wall on the outer side of the storage groove 21. In the concave part 220, at least one of the upper surface and the lower surface of the concave part 220 may be inclined relative to the side wall on the outer side of the storage groove 21, so that a distance between the upper surface of the concave part 220 (=the lower surface of the projection part 22) and the lower surface of the concave part 220 (=the groove bottom 213) becomes smaller toward the bottom of the concave part 220.

Furthermore, in the multi-optical axis photoelectric sensor 10, it is not necessary that the projection part 22 which is convex toward the center of the outer case 2 is formed on the side wall of the storage groove 21, and the projection part 22 may not be arranged on the side wall of the storage groove 21.

Figure 13A:
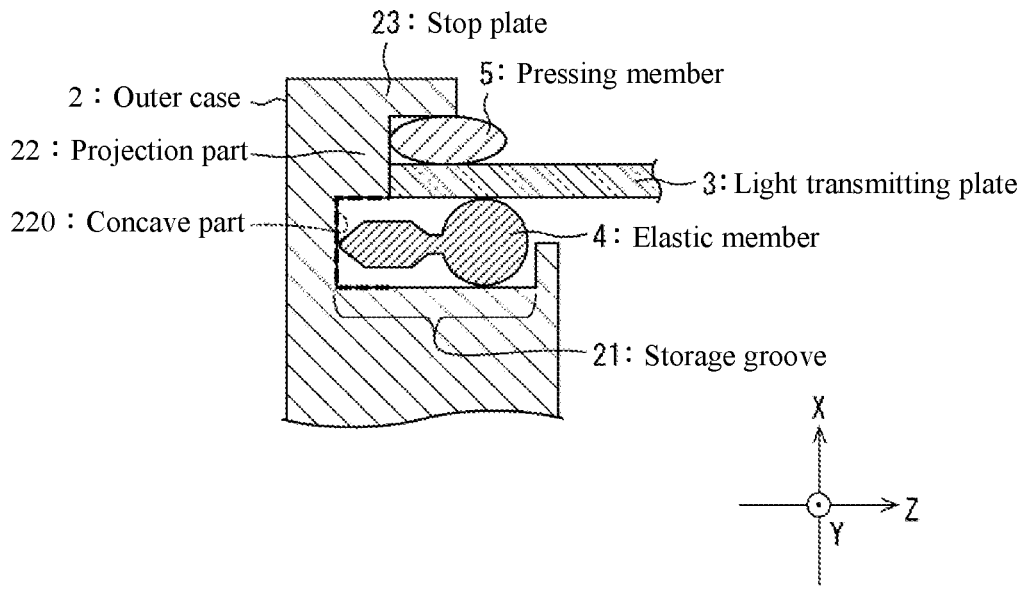
FIG. 13(A) and FIG. 13(B) is a drawing showing a variation of the storage groove provided on the housing in FIG. 1(A) and FIG. 1(B).
Figure 13B:
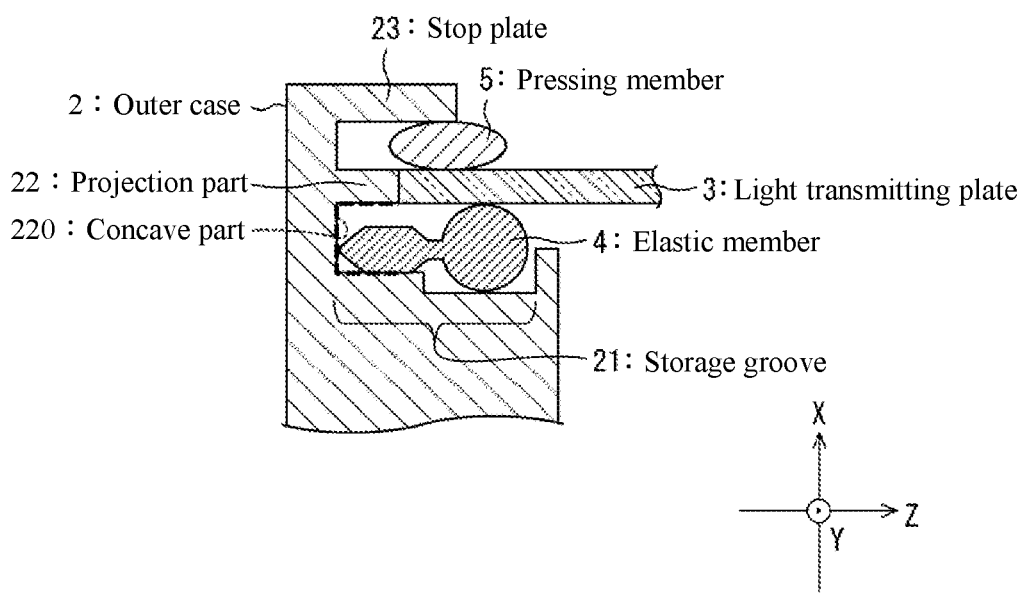

FIG. 13(A) and FIG. 13(B) is a drawing showing a variation of the storage groove 21 provided on the housing 1 (that is, the outer case 2). In the multi-optical axis photoelectric sensor 10, as illustrated in FIG. 13(A), the projection part 22 may be adjacent to the stop plate 23, that is, the projection part 22 which is convex toward the center of the outer case 2 may not be formed on the side wall of the storage groove 21. In the multi-optical axis photoelectric sensor 10, at least a part of the side wall of the storage groove 21 may be provided with the concave part 220 which is concave in a direction different from the pressing direction from the light transmitting plate 3 to the elastic member 4, and the side wall of the storage groove 21 may be a step-wise shape illustrated in FIG. 13(A).

Besides, in the multi-optical axis photoelectric sensor 10, it is not necessary that the groove bottom 213 (the bottom surface) of the storage groove 21 is a uniform plane; as illustrated in FIG. 13(B), a step may be formed on the groove bottom 213.

The disclosure is not limited to the above-described embodiments, various modifications can be made in the scope shown in the claims, and the embodiments obtained by appropriately combining the technical means which are respectively disclosed in different embodiments are also included in the technical scope of the disclosure.

What is claimed is:

1. A multi-optical axis photoelectric sensor, in which external shapes of a light projector and a light receiver are respectively formed by a housing comprising an outer case having an opened front surface and a light transmitting plate for blocking the front surface, and the multi-optical axis photoelectric sensor comprising:
    a storage groove arranged around an edge of the outer case; and
    a string-shaped elastic member that is interposed between the outer case and the light transmitting plate in a state of being stored in the storage groove, and that seals a gap between the outer case and the light transmitting plate; wherein
    at least a part of a side wall of the storage groove is provided with a concave part that is concave in a direction different from a pressing direction from the light transmitting plate to the elastic member, and
    the elastic member comprises a part arranged outside the concave part.

2. The multi-optical axis photoelectric sensor according to claim 1, wherein
    at least a part of the side wall of the storage groove is provided with a projection part which is convex toward another side wall, and
    the concave part is configured by the projection part, the side wall of the storage groove, and a bottom surface of the storage groove.

3. The multi-optical axis photoelectric sensor according to claim 1, wherein
    on at least a part of the elastic member, a sealing part and a twist suppression part are integrally formed,
    the sealing part is pressed to a bottom surface of e storage groove by the light transmitting plate, and
    the twist suppression part is not in contact with e light transmitting plate and is stored in the concave part.

4. The multi-optical axis photoelectric sensor according to claim 1, wherein
    in regard to at least a part of the elastic member, in a cross section perpendicular to an extending direction of the elastic member, a length of a direction perpendicular to the pressing direction is longer than a length in the pressing direction from the light transmitting plate to the elastic member.

5. The multi-optical axis photoelectric sensor according to claim 3, wherein
    a cross section of the sealing part perpendicular to the extending direction of the elastic member is substantially circular.

6. The multi-optical axis photoelectric sensor according to claim 3, wherein
    the twist suppression part comprises a part which is convex toward an inner wall of the concave part in a state that the elastic member is stored in the storage groove.

7. The multi-optical axis photoelectric sensor according to claim 3, wherein
    only the sealing part in the elastic member stored in the storage groove is formed in a corner part of the outer case.

8. The multi-optical axis photoelectric sensor according to claim 1, wherein
    a first part of the elastic member stored in the storage groove is formed in a straight part of the outer case, a second part of the elastic member stored in the storage groove is formed in a corner part of the outer case, and the first and second parts of the elastic member are separable.

9. The multi-optical axis photoelectric sensor according to claim 2, wherein
    on at least a part of the elastic member, a sealing part and a twist suppression part are integrally formed,
    the sealing part is pressed to the bottom surface of the storage groove by the light transmitting plate, and
    the twist suppression part is not in contact with the light transmitting plate and is stored in the concave part.

10. The multi-optical axis photoelectric sensor according to claim 2, wherein in regard to at least a part of the elastic member, in a cross section perpendicular to an extending direction of the elastic member, the length of a direction perpendicular to the pressing direction is longer than the length in the pressing direction from the light transmitting plate to the elastic member.

11. The multi-optical axis photoelectric sensor according to claim 3, wherein in regard to at least a part of the elastic member, in a cross section perpendicular to an extending direction of the elastic member, the length of a direction perpendicular to the pressing direction is longer than the length in the pressing direction from the light transmitting plate to the elastic member.

12. The multi-optical axis photoelectric sensor according to claim 5, wherein the twist suppression part comprises a part which is convex toward an inner wall of the concave part in a state that the elastic member is stored in the storage groove.

13. The multi-optical axis photoelectric sensor according to claim 5, wherein only the sealing part in the elastic member stored in the storage groove is formed in a corner part of the outer case.

14. The multi-optical axis photoelectric sensor according to claim 6, wherein only the sealing part in the elastic member stored in the storage groove is formed in a corner part of the outer case.

15. The multi-optical axis photoelectric sensor according to claim 2, wherein a first part of the elastic member stored in the storage groove is formed in a straight part of the outer case, a second part of the elastic member stored in the storage groove is formed in a corner part of the outer case, and the first and second parts of the elastic member are separable.

16. The multi-optical axis photoelectric sensor according to claim 3, wherein a first part of the elastic member stored in the storage groove is formed in a straight part of the outer case, a second part of the elastic member stored in the storage groove is formed in a corner part of the outer case, and the first and second parts of the elastic member are separable.

17. The multi-optical axis photoelectric sensor according to claim 4, wherein a first part of the elastic member stored in the storage groove is formed in a straight part of the outer case, a second part of the elastic member stored in the storage groove is formed in a corner part of the outer case, and the first and second parts of the elastic member are separable.

18. The multi-optical axis photoelectric sensor according to claim 5, wherein a first part of the elastic member stored in the storage groove is formed in a straight part of the outer case, a second part of the elastic member stored in the storage groove is formed in a corner part of the outer case, and the first and second parts of the elastic member are separable.

19. The multi-optical axis photoelectric sensor according to claim 6, wherein a first part of the elastic member stored in the storage groove is formed in a straight part of the outer case, a second part of the elastic member stored in the storage groove is formed in a corner part of the outer case, and the first and second parts of the elastic member are separable.

20. The multi-optical axis photoelectric sensor according to claim 7, wherein a first part of the elastic member stored in the storage groove is formed in a straight part of the outer case, a second part of the elastic member stored in the storage groove is formed in a corner part of the outer case, and the first and second parts of the elastic member are separable.

* * * * *